United States Patent [19]

McSparran

[11] Patent Number: 4,920,291
[45] Date of Patent: Apr. 24, 1990

[54] MAGNETIC THRUST BEARING WITH HIGH FORCE MODULATION CAPABILITY

[75] Inventor: Lloyd W. McSparran, Pittsburgh, Pa.

[73] Assignee: Contraves Goerz Corporation, Pittsburgh, Pa.

[21] Appl. No.: 299,882

[22] Filed: Jan. 19, 1989

[51] Int. Cl.$^5$ .............................................. F16C 39/06
[52] U.S. Cl. ................................................. 310/90.5
[58] Field of Search ......................... 310/90.5, 90, 268

[56] References Cited

U.S. PATENT DOCUMENTS

| | | | |
|---|---|---|---|
| 4,012,083 | 3/1977 | Habermann et al. | 308/10 |
| 4,180,296 | 12/1979 | Habermann | 308/10 |
| 4,353,602 | 10/1983 | Habermann | 308/10 |
| 4,387,936 | 6/1983 | Ishizawa | 310/90.5 |
| 4,583,031 | 4/1986 | Brunet | 310/90.5 |
| 4,683,391 | 7/1987 | Higuchi | 310/90.5 |

FOREIGN PATENT DOCUMENTS 2309754 11/1976 France .............................. 310/90.5

Primary Examiner—R. Skudy
Attorney, Agent, or Firm—Webb, Burden, Ziesenheim & Webb

[57] ABSTRACT

An electromagnetic axial thrust bearing comprises a rotating member, at least one stationary member and a winding for generating a m.m.f. associated with the stationary member. The stationary member is comprised of a solid ferromagnetic material having at least one arc-shaped groove substantially concentric with the turning axis of the rotating member. The groove is lined with laminates of a ferromagnetic material. The winding is laid into the lined groove of the stationary member. The rotating member has a groove facing the groove in the stationary member. Laminates of ferromagnetic material are stacked thereon.

14 Claims, 2 Drawing Sheets

MAGNETIC THRUST BEARING WITH HIGH FORCE MODULATION CAPABILITY

BACKGROUND OF THE INVENTION

This invention relates to electromagnetic axial thrust bearings and, particularly, to thrust bearings with high force modulating capacity.

Electromagnetic axial thrust bearings are known and disclosed, for example, in U.S. Pat. Nos. 4,180,296 and 4,353,602. Electromagnetic thrust bearings comprise at least one electromagnet for counteracting the thrust, a displacement detector and a feedback control circuit for controlling the excitation of the electromagnet in response to changes in displacement. The axial thrust electromagnetic bearing typically comprises a stationary member or stator including an exciting winding and a low reluctance path for magnetic flux. A low reluctance rotating member or rotor is arranged in close proximity to the stationary member so that flux lines pass between the stationary and rotating members with a large component of the magnetic lines in the axial direction.

As is well known with transformers, motors, and electromagnetic bearings, rapidly changing flux induces eddy currents which in turn oppose change in flux. In the case of an electromagnetic bearing, opposition to change in flux increases the response time of the thrust bearing magnetic circuit. Laminated cores are known for reducing eddy currents. However, application of a laminated core to the rotor of an electromagnetic thrust bearing is not shown in the prior art. As correctly stated in U.S. Pat. No. 4,180,296, rotors cannot be made of laminated material because the mechanical strength of the rotor would be too weak.

The '296 patent discloses a thrust bearing having a large number of radial semicircular slots to reduce eddy currents. The disadvantages of this structure is that the slots themselves being filled with air or a nonconducting material have low magnetic permeability and reduce the total flux carrying capacity of the rotor. The thickness of the material remaining between the slots is difficult to reduce as much as might be desired. If the slots are not filled, the rotor becomes an annoying siren.

U.S. Pat. No. 4,353,602 discloses a magnetic bearing in which the problem of eddy currents in the rotor due to axial thrust magnetic bearing simply is not addressed. If the force in the electromagnetic thrust bearing is to be rapidly modulated, the eddy currents in both the stator and the rotor must be controlled.

It is known in the art to construct thrust bearing stators of magnetic cores comprising radially disposed E-shaped laminates. The laminates are stacked into milled radial slots. In this structure, sectors of the stator are not laminated since tapered laminates are not practical. In this case, the rotor is simply a solid piece of steel.

SUMMARY OF THE INVENTION

It is an object of this invention to provide an axial thrust electromagnetic bearing whose force can be rapidly modulated.

It is a further object of this invention to provide an axial thrust magnetic bearing that has reduced eddy current losses in both the stator and the rotor.

It is yet another object of this invention to provide a simple and easily manufactured stator and rotor structure for an axial thrust electromagnetic bearing which can be rapidly modulated and prevents excessive eddy current losses.

It is yet another object of this invention to enable the use of extremely high magnetic permeability aminated materials in an axial thrust magnetic bearing rotor.

An electromagnetic axial thrust bearing comprises a rotating member for turning about an axis and at least one stationary member fixed relative to the axis of the rotating member. A winding and current source are provided for generating a magneto motive force (m.m.f.). The winding is associated with the stationary member. The rotating member and stationary member having adjacent faces in close proximity. The rotating member, stationary member, and m.m.f. generating winding are arranged so that the path of magnetic flux passes from the stationary member to the rotating member and back with the magnetic flux lines passing between the stationary member and rotating member having a large component in the axial direction. This results in a magnetic attraction between the members that produces a restraining thrust force.

According to this invention, the stationary member is comprised of a solid ferromagnetic material having at least one arc-shaped groove substantially concentric with the turning axis of the rotating member. The groove is lined with laminates of a ferromagnetic material. The winding for generating a m.m.f. is laid into the lined groove of the stationary member. The rotating member has laminates of ferromagnetic material stacked thereon, preferably, in a groove facing the groove in the stationary member.

Preferably, the long axes of laminates at the bottom of the groove in the stationary member have large components in the radial and circumferential directions and the long axes of laminates at the sides of the groove have large components in the axial and circumferential directions. Also, the directions of the long axes of laminates in the groove on the face of the rotating member have large components in the radial and circumferential directions. (By "long axes" are meant the directions perpendicular to the thickness of the laminates.)

The laminates may have a thickness between 0.004 and 0.060 inch. Typically, the laminates have a thickness of about 0.015 inch. The laminates are magnetically soft ferromagnetic materials selected from the group high purity iron, low carbon steels, silicon steels, iron-nickel alloys, iron-cobalt alloys and the like. The solid portions of the rotating and stationary members are magnetically soft ferromagnetic materials selected from the group low carbon steels, silicon steels, iron-nickel alloys, iron-cobalt alloys and the like.

A number of configurations for the arc-shaped grooves in the stationary and rotating members are permissible. They may extend entirely around the turning axis. Where more than one arc-shaped groove extends entirely around the turning axis, the windings in adjacent grooves are preferably laid so that current flow is in different circumferential directions. A plurality of pairs of concentric arc-shaped grooves joined at the ends thereof may be provided in the stationary member with individual coils laid in each pair of grooves (see FIG. 3).

Preferably, the rotating member is disc shaped with lamination lined grooves on each axial face (see FIG. 2) and stationary members facing each axial face. The rotating members may have flat groove carrying faces or conical groove carrying faces.

Most preferably, the lines of flux between the rotating and stationary members are substantially all parallel to the turning axis of the rotating member. However, the lines of flux between the rotating and stationary members should substantially all be within 45 degrees with the turning axis of the rotating member.

The combined thickness of the laminations in the groove of the rotating member should be such that the ratio of the cross-sectional area of the combined lamination to the cross-sectional area of the portion of the rotating member through which the remainder of the flux passes is at least as great as the ratio between the expected peak-to-peak modulation of the restraining thrust force to the total expected restraining thrust force. Likewise, the combined thickness of the laminations lining the groove of the stationary member should be such that the ratio of the cross-sectional area of the combined lamination in the stationary member to the cross-sectional area of the portion of the stationary member through which the remainder of the flux passes is at least as great as the ratio between the expected peak-to-peak modulation of the restraining thrust force to the total expected restraining thrust force. Thereby, the change in flux due to rapid modulation of the m.m.f. for the most part occurs in the laminations.

DESCRIPTION OF THE PREFERRED EMBODIMENTS

Figure 1:
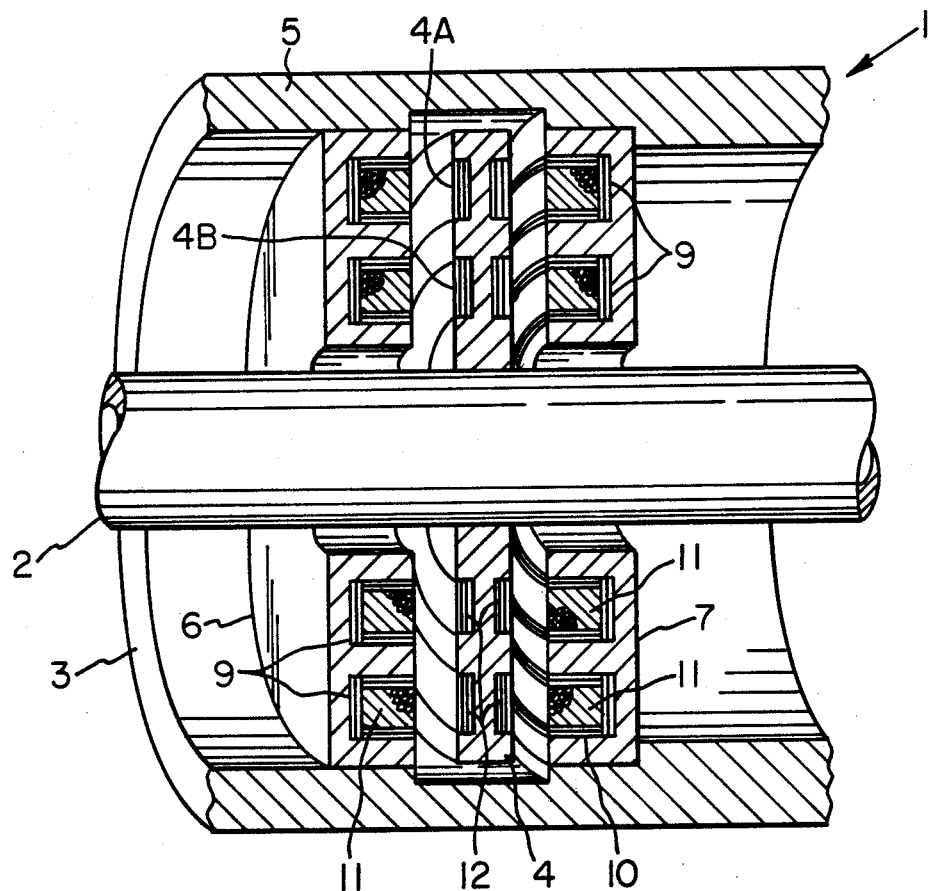
FIG. 1 is a section view of a magnetic bearing according to one embodiment of this invention.

Referring to FIG. 1, a magnetic axial thrust bearing 1 for controlling the axial position of a shaft 2 is comprised of a stationary assembly 3 and a rotating assembly 4. The rotating assembly 4 is fixed to the shaft as by keying or welding to assure the axial forces can be transmitted therebetween. The rotating assembly and shaft are free to turn relative to the stationary assembly. The shaft is journaled relative to the stationary assembly by bearings that are not shown and which form no part of this invention. The rotating assembly is axially constrained relative to the stationary assembly by magnetic forces. The rotating assembly 4 is disc shaped and made of a ferromagnetic steel. The shaft can be the shaft of any number of kinds of rotating machinery.

The stationary assembly 3 is comprised of a housing 5 which mechanically supports thrust bearing stators 6 and 7. The stators are comprised of a solid ferromagnetic shell having concentric annular grooves in the face thereof adjacent to the rotating assembly. The grooves are lined by ferromagnetic laminations on the bottom of the grooves 9 and on the sides of the grooves 10. A magnetizing winding 11 is laid into each lined groove.

Figure 2:
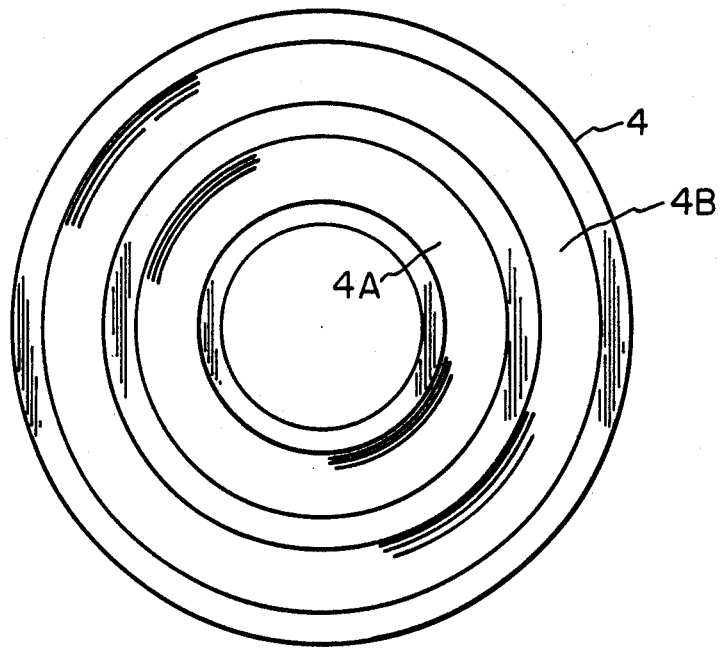
FIG. 2 is a plan view of a rotating member as shown in FIG. 1.

Referring to FIG. 2, the rotating member 4 has two annular concentric grooves on each face 4A, 4B having lamination 12 stacked thereon. The laminations 12 are positioned facing the windings 11 in the stators.

Figure 3:
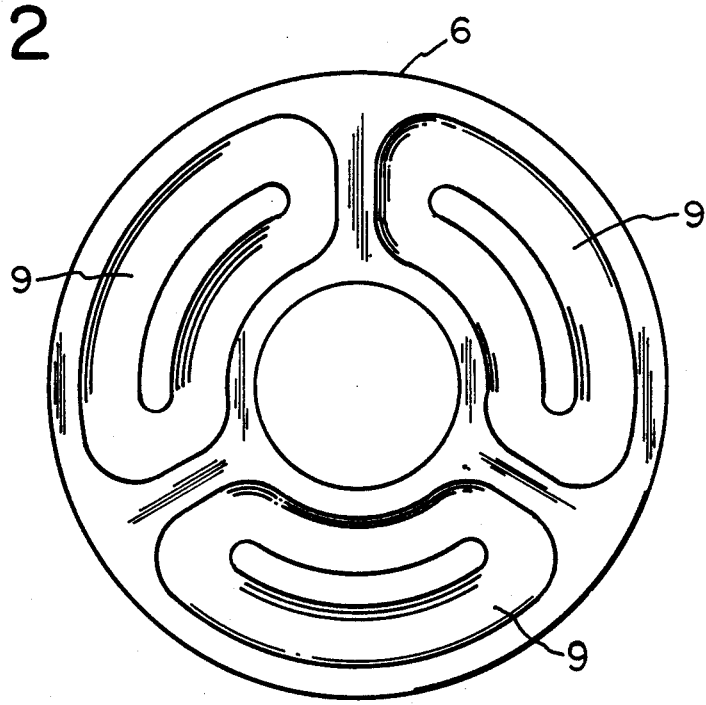
FIG. 3 is a plan view of a stationary member for an alternate embodiment.

The arc-shaped grooves 9 in the stationary member may extend around the turning axis. In a preferred embodiment shown in FIG. 3, a plurality of pairs of concentric arc-shaped grooves 9 joined at the ends thereof have individual windings laid in each pair of grooves.

In the operation of the magnetic axial thrust bearing according to this invention, the currents in the windings are adjusted in response to deviations in the position of the shaft relative to the stationary member to thus hold the shaft at the desired axial position. Position detectors and feedback circuits for controlling the current for this purpose are known in the art.

The attractive force of the electromagnets may be characterized by the following equation:

$$F = \frac{B^2 \times A}{2\mu_0}$$

Where B=flux density, A=cross-sectional area and $\mu_0$=magnetic permeability of free space.

The total force of attraction may be considered as the sum of the attraction between the laminated and unlaminated portions of the flux path as follows:

F total = F laminated + F solid.

Assuming that the permeability and the flux density in the laminated and unlaminated or solid portions of the flux path are substantially the same under steady state conditions, the distribution of force between the laminated and unlaminated portions is proportional to their cross-sectional areas.

Since eddy currents may be expected to resist changes in the flux when it is desired to modulate the force in the bearing, the changes in flux due to modulation will, for the most part, take place in the laminations. This being the case, the ratio of cross-sectional area of the laminates to the cross-sectional area to the remainder of the magnetic flux path should be greater than the ratio of the expected peak-to-peak modulating force to the expected total restraining force. Of course, the cross-sectional area should be no greater than necessary so that the rotor will have sufficient mechanical strength.

An aspect of the applicant's invention is the consideration that the entire rotor need not be made of laminations to accommodate the modulating forces but only so much of it as required to carry the rapidly changing forces of the magnetic flux during modulation.

I claim:

1. In an electromagnetic axial thrust bearing comprising a rotating member for turning about an axis, at least one stationary member fixed relative to the axis of the rotating member, means for generating a m.m.f. associated with said stationary member, said rotating member and stationary member having adjacent faces in close proximity, said rotating member, stationary member, and m.m.f. generating means arranged so that the path of magnetic flux resulting from said m.m.f. generating means passes from the stationary member to the rotating member and back, magnetic flux lines passing between the stationary member and rotating member having a component in the axial direction resulting in a magnetic attraction between the members that produces a restraining thrust force, the improvement comprising:

said stationary member comprised of a solid ferromagnetic material having at least one of arc-shaped grooves substantially concentric with the turning axis of the rotating member, said groove being lined with laminates of a ferromagnetic material thus defining a lined groove, said groove being defined by two sides and a bottom, the long axes of laminates at the bottom of the groove being substantially in the radial and circumferential directions and the long axes of laminates at the sides of the groove being substantially in the axial and circumferential directions, said m.m.f. generating means comprising a coil laid into the lined groove of the stationary member, and said rotating member having a groove facing the groove in the stationary member, said groove in the rotating member having laminates of ferromagnetic material stacked therein, the long axes of the laminates in the groove on the face of the rotating member being substantially in the radial and circumferential directions.

2. The improvements of claim 1 wherein the laminates have a thickness between 0.004 and 0.060 inch.

3. The improvements of claim 1 wherein the laminates have a thickness of about 0.015 inch.

4. The improvements of claim 1 wherein the laminates are magnetically soft ferromagnetic materials.

5. The improvements of claim 1 wherein the stationary member and rotating member are magnetically soft ferromagnetic materials selected from the group low carbon steels, silicon steels, iron-cobalt alloys and iron-nickel alloys.

6. The improvements of claim 1 wherein the arc-shaped grooves in the stationary and rotating members extend entirely around the turning axis.

7. The improvements of claim 1 wherein more than one of the arc shaped grooves extends entirely around the turning axis and the coils in adjacent grooves are laid so that current flow is in different circumferential directions.

8. The improvements of claim 1 wherein a plurality of pairs of concentric arc-shaped grooves joined at the ends thereof are provided in the stationary member with individual coils laid in each pair of grooves.

9. The improvement in claim 1 wherein the rotating member is disc shaped with lamination lined grooves on each axial face and stationary members facing each axial face.

10. The improvements in claim 1 wherein the rotating member is disc shaped.

11. The improvements in claim 1 wherein the lines of flux between the rotating and stationary members are substantially all parallel to the turning axis of the rotating member.

12. The improvements in claim 1 wherein the lines of flux between the rotating and stationary members are substantially all within 45 degrees with the turning axis of the rotating member.

13. The improvements in claim 1 wherein the combined thickness of the laminations in the groove of the rotating member is such that the ratio of the cross-sectional area of the combined laminations in the rotor to the cross sectional area of the portion of the rotating member through which the remainder of the flux caused by the m.m.f. generating means passes is at least as great as the ratio between the expected peak-to-peak modulation of the restraining thrust force to the total restraining thrust force.

14. The improvements in claim 1 wherein the combined thickness of the laminations lining the groove of the stationary member is such that the ratio of the cross-sectional area of the combined laminations in the stationary member to the cross-sectional area of the portion of the stationary member through which the remainder of the flux caused by the m.m.f. generating means passes is at least as great as the ratio between the peak to peak modulation of the expected restraining thrust force to the total restraining thrust force.

* * * * *